United States Patent
Nozaki et al.

(10) Patent No.: US 7,033,297 B2
(45) Date of Patent: Apr. 25, 2006

(54) SHIFT CONTROL APPARATUS FOR AUTOMATIC TRANSMISSION

(75) Inventors: Yoshinobu Nozaki, Anjo (JP); Hideo Tomomatsu, Nagoya (JP); Katsuyuki Tanahashi, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 102 days.

(21) Appl. No.: 10/845,119

(22) Filed: May 14, 2004

(65) Prior Publication Data

US 2004/0242361 A1     Dec. 2, 2004

(30) Foreign Application Priority Data

May 28, 2003   (JP)   ............................. 2003-150965

(51) Int. Cl.
*F16H 31/00*   (2006.01)
*F16H 61/04*   (2006.01)

(52) U.S. Cl. .................. 475/129; 477/145; 477/150

(58) Field of Classification Search ........ 475/127–129, 475/116; 477/117, 145, 150, 156
See application file for complete search history.

(56) References Cited

U.S. PATENT DOCUMENTS

| | | | | |
|---|---|---|---|---|
| 4,768,635 | A | * | 9/1988 | Sakurai et al. .............. 477/169 |
| 5,207,617 | A | * | 5/1993 | Kato et al. .................. 474/28 |
| 5,293,789 | A | * | 3/1994 | Goto et al. .................. 477/151 |
| 5,857,935 | A | * | 1/1999 | Takiguchi ................... 475/120 |
| 5,876,304 | A | * | 3/1999 | Takiguchi ................... 477/150 |
| 6,453,763 | B1 | * | 9/2002 | Tanizawa et al. ............. 74/335 |

FOREIGN PATENT DOCUMENTS

| | | | |
|---|---|---|---|
| JP | 01247852 A | * | 10/1989 |
| JP | 5-39859 | | 2/1993 |
| JP | 6-109119 | | 4/1994 |
| JP | 11-22817 | | 1/1999 |
| JP | 2000-205403 | | 7/2000 |

OTHER PUBLICATIONS

Instruction Manual for New Model "Land Cruiser 100", Published on Aug. 5, 2002, 1 page.

* cited by examiner

*Primary Examiner*—Tisha Lewis
(74) *Attorney, Agent, or Firm*—Oblon, Spivak, McClelland, Maier & Neustadt, P.C.

(57) ABSTRACT

A shift control apparatus for controlling shifting actions of an automatic transmission including a hydraulically operated frictional coupling device having a hydraulic cylinder which is supplied with a working fluid when the frictional coupling device is engaged, the shift control apparatus including a transient-hydraulic-pressure control device operable to control a transient value of a hydraulic pressure in the hydraulic cylinder according to an electric signal, upon releasing of the frictional coupling device, and an accumulator having a back-pressure chamber a back pressure of which is controllable, and an accumulator chamber connected to the hydraulic cylinder of the frictional coupling device and operable to control a transient value of the hydraulic pressure in the hydraulic cylinder, when the frictional coupling device is engaged with the working fluid being supplied to the hydraulic cylinder, and a back-pressure increasing portion operable to increase the back pressure in the back-pressure chamber of the accumulator for rapidly discharging the working fluid from the accumulator chamber, when the frictional coupling device is released to effect one of the shifting actions of the automatic transmission.

10 Claims, 12 Drawing Sheets

FIG.2

|      | C1 | C2 | C3 | C4  | B1  | B2  | B3 | B4  | F0 | F1 | F2 | F3 |
|------|----|----|----|-----|-----|-----|----|-----|----|----|----|----|
| Rev  |    |    | O  |     | (O) |     | O  |     | O  |    |    |    |
| N    |    |    |    |     |     |     |    |     |    |    |    |    |
| 1st  | O  |    |    | (O) |     |     |    | (O) | O  |    |    | O  |
| 2nd  | O  |    |    | (O) | (O) | O   |    |     | O  | O  | O  |    |
| 3rd  | O  |    | O  | (O) | (O) |     | ●  |     | O  | O  |    |    |
| 4th  | O  | O  | ●  | (O) |     |     | ●  |     | O  |    |    |    |
| 5th  | ●  | O  | O  |     | O   |     | ●  |     |    |    |    |    |
| 6th  | ●  | O  |    |     | ●   | O   | ●  |     |    |    |    |    |

SHIFT CONTROL APPARATUS FOR AUTOMATIC TRANSMISSION

This application is based on Japanese Patent Application No. 2003-150965 filed May 28, 2003, the contents of which are incorporated hereinto by reference.

BACKGROUND OF THE INVENTION

1. Field of the Invention

The present invention relates in general to a shift control apparatus for controlling shifting actions of an automatic transmission, and more particularly, to improvements of a shift control apparatus for controlling shifting actions of an automatic transmission each of which is achieved by engaging and releasing respective two hydraulically operated frictional coupling devices of the automatic transmission.

2. Discussion of Related Art

One example of an automatic transmission for a vehicle is a planetary gear type transmission including hydraulically operated frictional coupling devices each having a hydraulic cylinder which is supplied with a working fluid when the frictional coupling device is engaged. For controlling shifting actions of such a planetary gear type automatic transmission, there is known a shift control apparatus comprising (a) a transient-hydraulic-pressure control device operable to control a transient value of a hydraulic pressure in the hydraulic cylinder of the frictional coupling device according to an electric signal, when the frictional coupling device is released, and (b) an accumulator connected to the hydraulic cylinder and operable to control a transient value of the hydraulic pressure in the hydraulic cylinder, when the frictional coupling device is engaged with the working fluid being supplied to the hydraulic cylinder, the shift control apparatus being operable to control shifting actions of the automatic transmission by engaging and releasing actions of the frictional coupling device. An example of this type of shift control apparatus is disclosed in Instruction Manual for New Model "LAND CRUISER 100", published on Aug. 5, 2002 by Toyota Jidosha Kabushiki Kaisha.

JP-2000-205403A, JP-11-22817A, JP-6-109119A and JP-9-39859A disclose related techniques in the field of a shift control apparatus for an automatic transmission, which is as described above.

In the shift control apparatus of the type described above, a degree of smoothness of an engaging action of the frictional coupling device with a predetermined inertial characteristic increases with an increase in the capacity of the accumulator used, so that the amount of a shifting shock of the automatic transmission upon engagement of the frictional coupling device can be reduced by increasing the capacity of the accumulator. On the other hand, an increase in the capacity of the accumulator results in an increase in the length of time required for the pressurized working fluid to be fully discharged from the accumulator, upon releasing of the frictional coupling device, leading to undesirable deterioration of an operating response of the transient-hydraulic-pressure control device, since adequate control of the hydraulic pressure of the frictional coupling device by the transient-hydraulic-pressure control device is possible only after the full discharging of the working fluid from the accumulator. Thus, an increase in the accumulator capacity provides an advantage on one hand but at the same time suffers from a problem, in controlling the shifting actions of the automatic transmission.

SUMMARY OF THE INVENTION

The present invention was made in view of the background art discussed above. It is an object of the present invention to provide a shift control apparatus for an automatic transmission, which includes an accumulator having a sufficiently large capacity and which is constructed to minimize a shifting shock of the automatic transmission upon engaging of a frictional coupling device, while preventing deterioration of an operating response of a transient-hydraulic-pressure control device upon releasing of the frictional coupling device.

The object indicated above may be achieved according to the principle of this invention, which provides a shift control apparatus for controlling shifting actions of an automatic transmission having a hydraulically operated frictional coupling device having a hydraulic cylinder which is supplied with a working fluid when the frictional coupling device is engaged, the shift control apparatus comprising: (a) a transient-hydraulic-pressure control device operable to control a transient value of a hydraulic pressure in the hydraulic cylinder of the frictional coupling device according to an electric signal, upon releasing of the frictional coupling device; (b) an accumulator having a back-pressure chamber a back pressure of which is controllable, and an accumulator chamber connected to the hydraulic cylinder of the frictional coupling device and operable to control a transient value of the hydraulic pressure in the hydraulic cylinder, when the frictional coupling device is engaged with the working fluid being supplied to the hydraulic cylinder; and (c) a back-pressure increasing portion operable to increase the back pressure in the back-pressure chamber of the accumulator for rapidly discharging the working fluid from the accumulator chamber, when the hydraulically operated frictional coupling device is released to effect one of the shifting actions of the automatic transmission.

In the shift control apparatus constructed according to the present invention as described above, the back pressure in the back-pressure chamber of the accumulator is controllable, and the back-pressure increasing portion is provided to increase the back pressure for rapidly discharging the working fluid form the accumulator chamber of the accumulator when the hydraulically operated frictional coupling device is released to effect a shifting action of the automatic transmission. This arrangement permits the transient-hydraulic-pressure control device to initiate the control of the transient hydraulic pressure in the hydraulic cylinder of the frictional coupling device, at a relatively early point of time after the frictional coupling device is commanded to be released, even where the accumulator chamber of the accumulator has a sufficiently large capacity. Therefore, the back-pressure increasing portion assures an improved operating response of the transient-hydraulic-pressure control device. In other words, the present shift control apparatus can use an accumulator having an accumulator chamber whose capacity is large enough to permit intricate control of the transient value of the hydraulic pressure in the hydraulic cylinder of the frictional coupling device, while minimizing a shifting shock of the automatic transmission, even when the frictional coupling device is engaged.

The shift control apparatus is suitably applicable to an automatic transmission for a vehicle such as a motor vehicle, which includes at least one planetary gear set and a plurality of hydraulically operated frictional coupling devices such as clutches and brakes that are engaged and released to place the automatic transmission in a selected one of a plurality of forward-drive positions having respective different speed ratios. However, the shift control apparatus of the present invention is equally applicable to an automatic transmission for any machines or equipment other than the vehicles, and to an automatic transmission of any types other than the planetary gear type.

The transient-hydraulic-pressure control device may include a linear solenoid valve or a solenoid-operated valve, and a control valve controllable by the linear solenoid valve or the solenoid-operated valve. In this case, the linear solenoid valve or the solenoid-operated valve is controlled by a control device, for discharging the working fluid from the hydraulic cylinder of the frictional coupling device through the control valve such that the transient hydraulic pressure in the hydraulic cylinder during a releasing action of the frictional coupling device is continuously reduced after the back pressure is increased by the back-pressure increasing portion. Where the solenoid-operated valve is used, its duty ratio is controlled by the control device. In addition to the back-pressure increasing portion operable to increase the back pressure of the accumulator upon releasing of the frictional coupling device, a back-pressure control device may be provided to control the back pressure of the accumulator according to an electric signal during an engaging action of the frictional coupling device. This back-pressure control device may include a linear solenoid valve or a solenoid-operated valve, and an accumulator control valve which is controllable by the linear solenoid valve or the solenoid-operated valve and which is connected to the back-pressure chamber of the accumulator. In this case, the linear solenoid valve or solenoid-operated valve is controlled by a control device such that the back pressure of the accumulator during an engaging action of the frictional coupling device is slowly reduced.

The back-pressure increasing portion may include a linear solenoid valve or a solenoid-operated valve, an accumulator control valve which is controllable by the linear solenoid valve or solenoid-operated valve and which is connected to the back-pressure chamber of the accumulator, and a control device operable to control the linear solenoid valve or solenoid-operated valve such that a pressure of the working fluid supplied from the accumulator control valve to the back-pressure chamber is increased. Alternatively, the back-pressure increasing portion includes a supply passage, a switching valve which is connected to the back-pressure chamber of the accumulator and which has a line-pressure supply position in which a line pressure received through the supply passage is applied to the back-pressure chamber, and a controlled-pressure supply position in which a controlled pressure is applied to the back-pressure chamber, and a control device operable to place the switching valve in the line-pressure supply position for applying the line pressure to the back-pressure chamber, to thereby increase the back pressure in the back-pressure chamber. The switching valve may be arranged to receive the controlled pressure from the accumulator control valve of the back-pressure control device described above. In this case, the controlled pressure received from the accumulator control valve is applied to the back-pressure chamber through the switching valve placed in the controlled-pressure supply position.

Each of the shifting actions of the automatic transmission which are effected by engaging and releasing the frictional coupling device in question may be a shift-up or shift-down action. The back-pressure increasing portion is operable to increase the back pressure in the back-pressure chamber of the accumulator, when the hydraulically operated frictional coupling device is released to shift up the automatic transmission. In this case, a shift-up action of the automatic transmission may be effected when another hydraulically operated frictional coupling device of the automatic transmission is engaged while the hydraulically operated frictional coupling device in question (the hydraulic cylinder of which is connected to the accumulator chamber of the accumulator) is released.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 2 is a view indicating combinations of operating states of hydraulically operated frictional coupling devices provided for an automatic transmission of the vehicle drive system of FIG. 1, and operating positions of the automatic transmission which are established by the respective combinations of the operating states;

DETAILED DESCRIPTION OF THE PREFERRED EMBODIMENT

Figure 1:
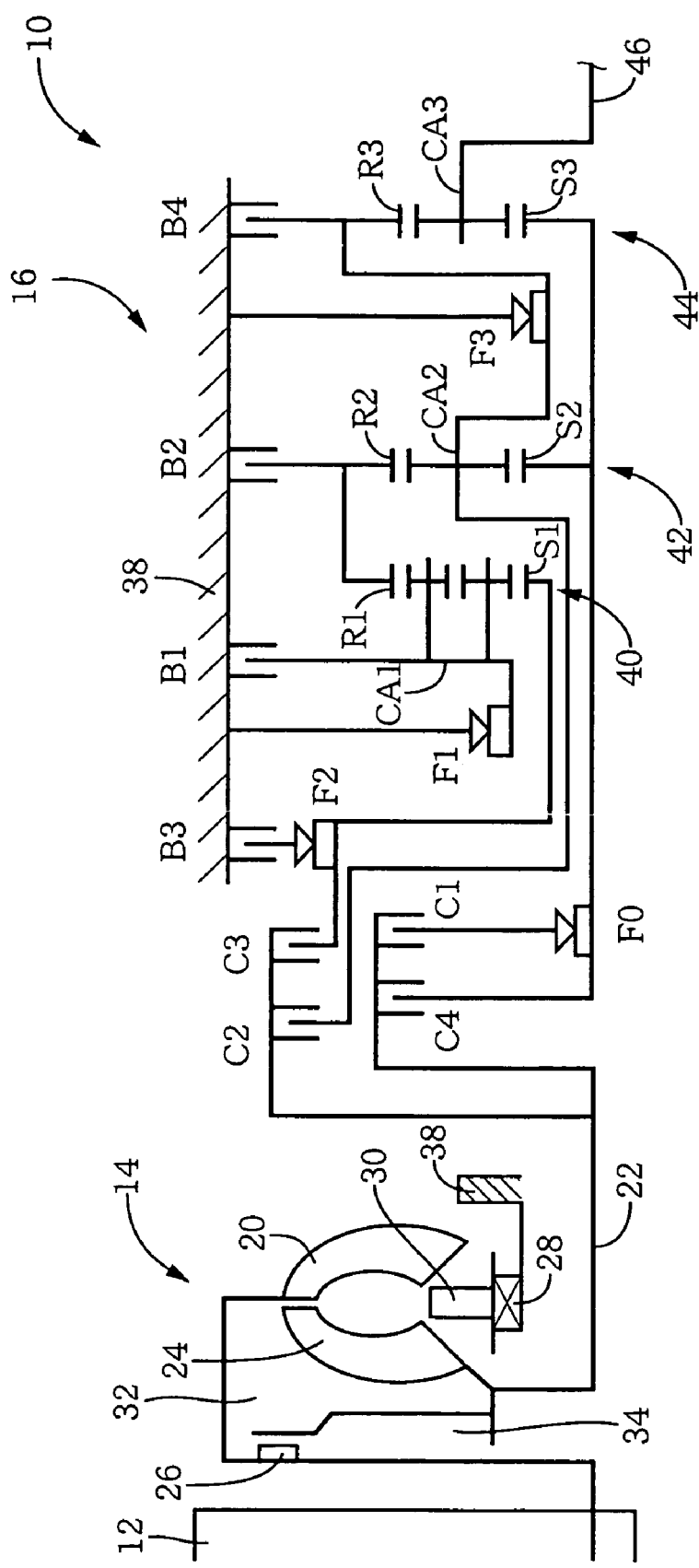
FIG. 1 is a schematic view showing a vehicle drive system to which the present invention is applicable.

There will be described in detail some embodiments of this invention, referring to the accompanying drawings. Reference is first made to the schematic view of FIG. 1, there is shown a vehicle drive system 10 to which the principle of this invention is applicable. The vehicle drive system 10 includes an engine 12 an output of which is transmitted to an automatic transmission 16 through a fluid-operated power transmitting device in the form of a torque converter 14. The output of the engine 10 is transmitted from the torque convert 14 to drive wheels of a motor vehicle through a differential gear device and a drive axle, as well known in the art. The torque converter 14 includes a pump impeller 20 connected to the engine 12, a turbine impeller 24 connected to an input shaft 22 of the automatic transmission 16, and a stator impeller 30 a rotary motion of which in one direction is prevented by a one-way clutch 28. In the torque converter 14, a rotary motion is transmitted through a working fluid between the pump impeller 20 and the turbine impeller 24, and a lock-up clutch 27 is disposed between the pump and turbine impellers 20, 24, for direction connection of these impellers 20, 24. The lock-up clutch 26, which has an engaging fluid chamber 32, and a releasing fluid chamber 34, is a hydraulically operated frictional clutch which is frictionally engaged in the presence of a fluid pressure difference $\Delta P$ between a fluid pressures in the engaging and releasing fluid chambers 32, 34. In the fully engaged state of the lock-up clutch 26, the pump impeller 20 and the turbine impeller 24 are rotated as a unit, namely, directly connected to each other by the lock-up clutch 26.

The automatic transmission 16 is a planetary gear type transmission including a first planetary gear set 40 of double-pinion type, a second planetary gear set 42 of single-pinion type, and a third planetary gear set 44. The first planetary gear set 40 has a sun gear S1 which is selectively connected through a clutch C3 to the input shaft 22. Further, the sun gear S1 is selectively connected to a housing 38 of the automatic transmission 16 through a one-way clutch F2 and a brake B3, so that a rotary motion of the sun gear S1 in a direction opposite to a direction of rotation of the input shaft 22 is prevented. The first planetary gar set 40 further has a carrier CA1 which is selectively connected to the housing 38 through a brake B1. The carrier CA1 is also connected to a one-way-clutch F1, such that the one-way clutch F1 and the brake B1 are disposed in parallel with each other, so that the one-way clutch F1 always prevents a rotary motion of the carrier CA1 in a reverse direction. The first planetary gear set 40 also has a ring gear R1 which is integrally connected to a ring gear R2 of the second planetary gear set 42, and which is selectively connected to the housing 38 through a brake B2. The second planetary gear set 42 has a sun gear S2 which is integrally connected to a sun gear S3 of the third planetary gear set 44. Further, the sun gear S2 is selectively connected to the input shaft 22 through a clutch C4, and also selectively connected to the input shaft 22 through a one-way clutch F0 and a clutch C1, so that a rotary motion of the sun gear S2 in a direction opposite to the direction of rotation of the input shaft 22 is prevented. The second planetary gear set 42 further has a carrier CA2 which is integrally connected to a ring gear R3 of the third planetary gear set 44 and selectively connected to the input shaft 22 through a clutch C2. Further, the carrier CA2 is selectively connected to the housing 38 through a brake B4, and is also connected to a one-way clutch F3, such that the one-way clutch F3 and the brake B4 are disposed in parallel with each other, so that the one-way clutch F3 always prevents a rotary motion of the carrier CA2 in a reverse direction. The third planetary gear set 44 has a carrier CA3 which is integrally connected to an output shaft 46 of the automatic transmission 46.

Figure 3:
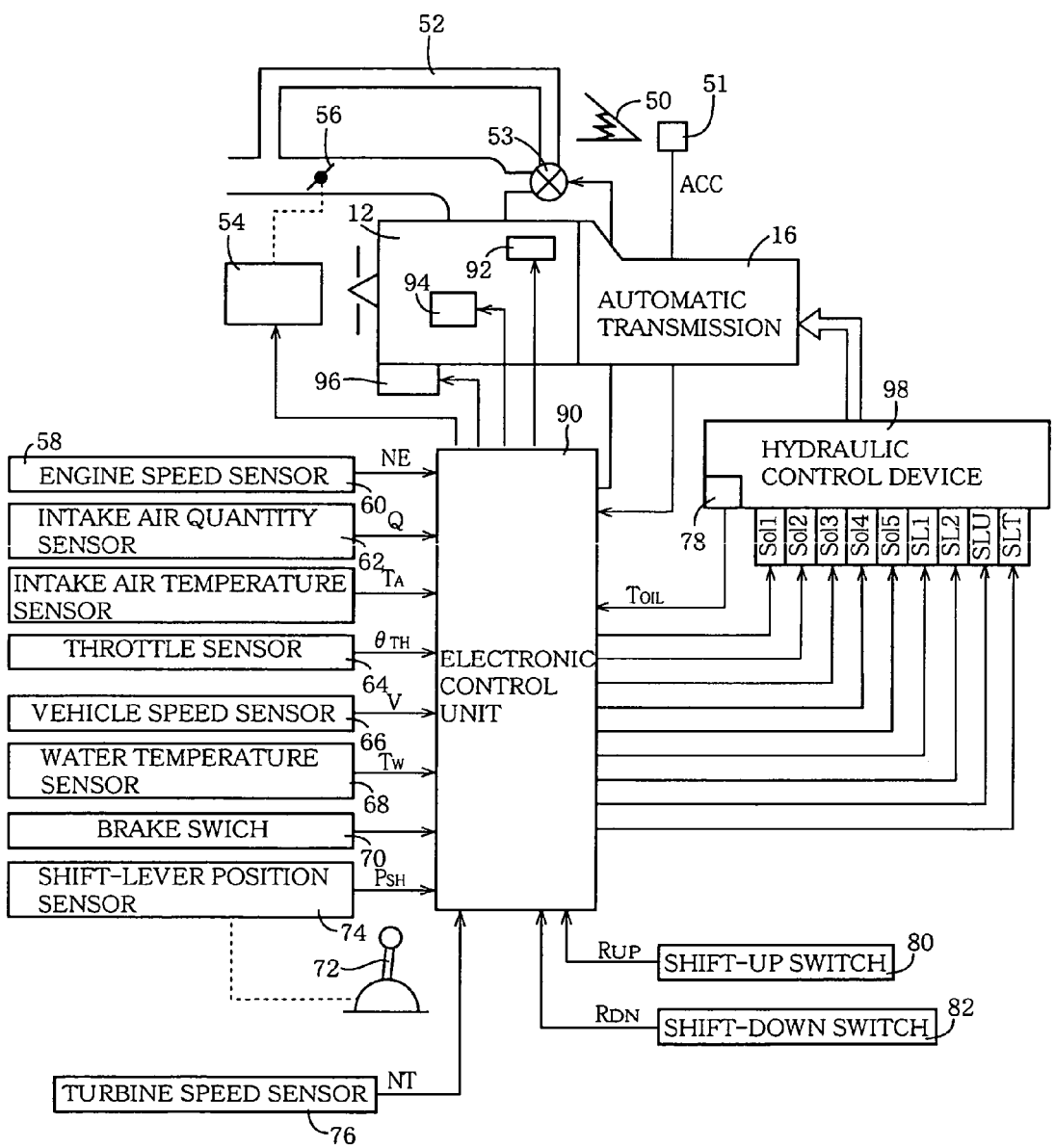
FIG. 3 is a block diagram illustrating major elements of a control system provided for controlling the vehicle drive system of FIG. 1.
Figure 4:
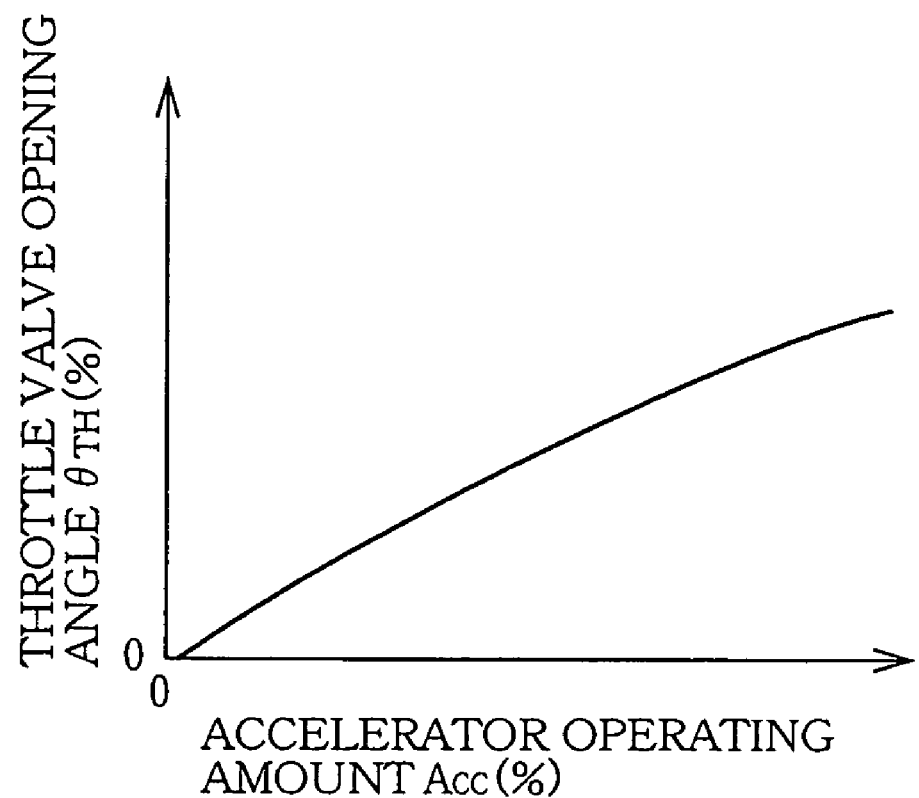
FIG. 4 is a view indicating a relationship between an opening angle of an electronic throttle valve of the control system of FIG. 3 and an operating amount of an accelerator pedal of the vehicle.

The above-described clutches C1–C4 and brakes B1–B4 are hydraulically operated frictional coupling devices such as multiple-disc clutches and brakes, which include respective hydraulic cylinders or actuators and which are engaged and released by operations of the hydraulic actuators that are controlled by energization and de-energization of solenoid-operated valves Sol1–Sol5 of a hydraulic control device 98 shown in FIG. 3, and by controlling electric currents to be applied to linear solenoid valves SL1 and SL2 of the hydraulic control device 98. Described in detail, the automatic transmission 16 has six forward-drive positions, namely, first-speed position (1$^{st}$), second-speed position (2$^{nd}$), third-speed position (3$^{rd}$) fourth-speed position (4$^{th}$), fifth-speed position (5$^{th}$) and sixth-speed position (6$^{th}$), and one reverse-drive position (Rev). Depending upon a presently selected position of a shift lever 72 (shown in FIGS. 3 and 5), a manual valve (not shown) of the hydraulic control device 98 is operated, and one of the forward-drive positions 1$^{st}$ through 6$^{th}$ and reverse-drive position (Rev) is established by an appropriate one of different combinations of the operating states (engaged and released states) of the clutches C1–C4, brakes B1–B4 and one-way clutches F1–F3, as indicated in FIG. 2 by way of example. The first-, second-, third-, fourth-, fifth- and sixth-speed positions (1$^{st}$ through 6$^{th}$) have respective different speed ratios which decrease in the order of the description. The speed ratios are represented by a rotating speed Nin of the input shaft 22 divided by a rotating speed Nout of the output shaft 46. The fourth-speed position (4$^{th}$) has the speed ratio of 1.0. In FIG. 2, "o" indicates the engaged states of the clutches C1–C4, brakes B1–B4 and one-way clutches F0–F3, and blanks indicate the released states. Further, "(o)" indicate the engagement of the clutches and brakes when an engine brake is applied to the vehicle, while "•" indicates the engagement of the clutches and brakes not contributing transmission of power through the automatic transmission 16.

Figure 8:
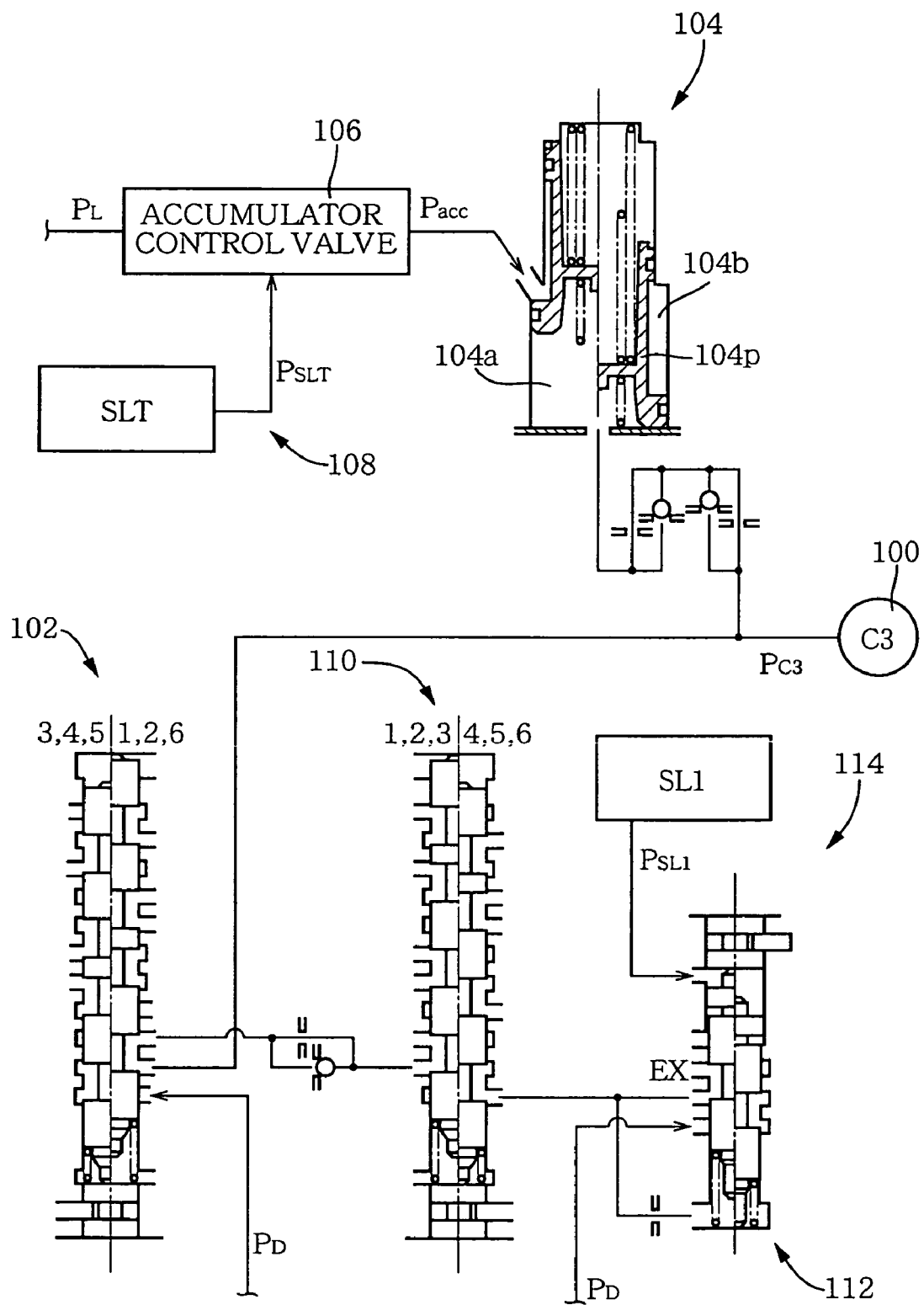
FIG. 8 is a view showing elements of the hydraulic control device, which are associated with a clutch C3 of the automatic transmission, in one embodiment of this invention.

The hydraulic control device 98 shown in FIG. 3 includes not only the above-indicated solenoid-operated valves Sol–Sol5 and linear solenoid valves SL1 and SL2, but also a linear solenoid valve SLU provided to control a difference $\Delta P$ between the fluid pressures in the engaging fluid chambers 32 and 34 of the lock-up clutch 26, and a linear solenoid valve SLT provided to control a line pressure $P_L$ (indicated in FIG. 8) and a back pressure Pacc in a back-pressure chamber 104$b$ of an accumulator 104 (also indicated in FIG. 8). The pressurized fluid delivered from the hydraulic pressure control device 98 is also supplied to the lock-up clutch 14, and is used to lubricate various parts of the automatic transmission 16.

Referring next to the block diagram of FIG. 3, there is illustrated a control system for controlling the vehicle drive system including the engine 12 and the automatic transmission 16 which are shown in FIG. 1. The control system includes an accelerator sensor 51 operable to detect an operating amount Acc of an accelerator pedal 50 provided on the vehicle. The accelerator pedal 50 is a manually operable vehicle accelerating member, which is operable by an operator of the vehicle to control a desired output of the engine 12. The operating amount Acc of the accelerator pedal 50 corresponds to the desired amount of the engine 12. The engine 12 is provided with an intake pipe in which is disposed an electronic throttle valve 56 an opening angle $\theta_{TH}$ of which is controlled by a throttle actuator 54 on thee basis of the accelerator operating amount Acc. The engine 12 is further provided with a by-pass passage 52 which by-passes the electronic throttle valve 56. The by-pass passage 52 is provided to control an idling speed $NE_{IDL}$ of the engine 12. In this by-pass passage 52, there is disposed an idling speed control valve (ISC valve) 53 which is arranged to control an intake air quantity for controlling the idling speed $NE_{IDL}$ when the electronic throttle valve 56 is placed in its fully close state. The control system includes an electronic control unit (ECU) 90 to which are connected various sensors and switches including: an engine speed sensor 58 operable to detect an operating speed NE of the engine 12; an intake air quantity sensor 60 operable to detect an intake air quantity Q of the engine 12; an intake air temperature sensor 62 operable to detect a temperature $T_A$ of the intake air of the engine 12; a throttle sensor 64 provided with an idling detector switch, which is operable to detect the opening angle $\theta_{TH}$ of the electronic throttle valve 56, and an idling state of the engine 12; a vehicle speed sensor 66 operable to detect a running speed V of the vehicle (which corresponds to the rotating speed Nout of the output shaft 46); a water temperature sensor 68 operable to detect a temperature $T_w$ of cooling water for the engine 12; a brake switch 70 operable to detect an operation of a brake pedal for applying a service brake to the vehicle; a shift-lever position sensor 74 operable to detect a currently selected position $P_{SH}$ of the shift lever 72; a turbine speed sensor 76 operable to detect a turbine speed NT which is a rotating speed Nin of the input shaft 22; an oil temperature sensor 78 operable to detect a temperature $T_{OIL}$ of a working fluid within the hydraulic control device 98; a shift-up switch 80 operable to generate a shift-up command $R_{up}$ to shift up the automatic transmission 16; and a shift-down switch 82 operable to generate a shift-down command $R_{DN}$ to shift down the automatic transmission 16. The electronic control unit 90 is arranged to receive output signals of the above-indicated sensors and switches indicative of the engine speed NE, intake air quantity Q, intake air temperature $T_A$, throttle valve opening angle $\theta_{TH}$, vehicle speed V, water temperature $T_w$, an operating state of the brake pedal, shift lever position $P_{SH}$, turbine speed NT, oil temperature $T_{OIL}$, and shift-up and shift-down commands $R_{up}$ and $R_{DN}$.

The electronic control unit 90 includes a so-called microcomputer incorporating a CPU, a RAM, a ROM and an input-output interface. The CPU operates to perform signal processing operations according to control programs stored in the ROM, while utilizing a temporary data storage function of the RAM. The signal processing operations include an operation to control the output of the engine 12, sifting actions of the automatic transmission 16, and engaging and releasing actions of the lock-up clutch 26.

The output of the engine 12 is controlled by the electronic throttle valve 56 opened and closed by the throttle actuator 54, and by a fuel injector device 92 operable to control an amount of fuel injection into the engine 12, an igniter device 94 operable to control an ignition timing of the engine 12, and the ISC valve 54 to control the engine idling speed. The opening angle $\theta_{TH}$ of the electronic throttle valve 56 is controlled by the throttle actuator 54, which is controlled on the basis of the detected operating amount Acc of the accelerator pedal 50, and according to a predetermined relationship between the accelerator operating amount Acc and the throttle opening angle $\theta_{TH}$, such that the opening angle $\theta_{TH}$ increased with an increase in the accelerator operating amount Acc. The engine 12 is further provided with an engine starter 96, which includes a starter motor operable to crank the crankshaft of the engine 12, for thereby starting the engine 12.

Figure 5:
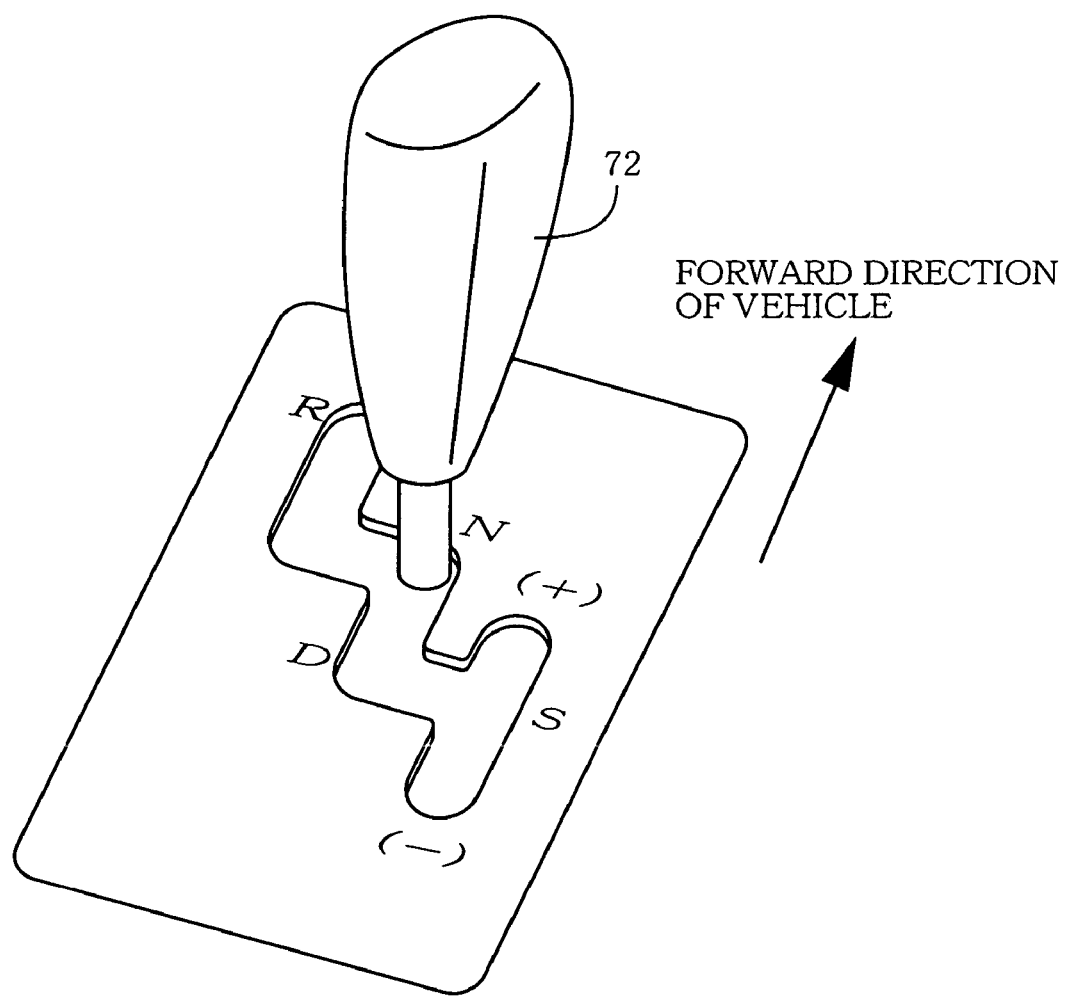
FIG. 5 is a perspective view showing a shift lever of the control system of FIG. 3.
Figure 7:
FIG. 7 is a view indicating operating positions of the shift lever of FIG. 5, and operating positions of the automatic transmission available in each of the operating positions of the shift lever.

The automatic transmission 16 is shifted depending upon the currently selected position $P_{SH}$ of the shift lever 72, which is located near the operator's seat of the vehicle. The shift lever 72 is manually operable to a selected one of four positions indicated in FIG. 5: a reverse position R selected to establish the reverse-drive position (Rev) for driving the vehicle in the backward direction; a neutral position N selected to cut off a power transmitting path of the automatic transmission 16; a drive position D selected to establish an automatic shifting mode in which the automatic transmission 16 is automatically shifted to one of the six forward-drive positions ($1^{st}$ through $6^{th}$) to drive the vehicle in the forward direction; and a sequential position S selected to establish a manual shifting mode to manually place the automatic transmission 16 to one of six shift ranges D, 5, 4, 3, 2 and L, which have respective different numbers of the forward-drive positions that can be selectable, as indicated in FIG. 7. As described above, the currently selected one of the four positions R, N, D, S is detected by the shift-lever position sensor 74. As shown in FIG. 5, the reverse position R is located nearest to the front end of the vehicle, and the drive and sequential positions D and S are located nearest to the rear end of the vehicle, while the neutral position N is located intermediate between the reverse position R and the drive and sequential positions D, S. The shift lever 72 is mechanically connected to the manual valve (not shown) through a cable or any other linkage, so that the manual valve is mechanically operated to effect hydraulic switching operations of the hydraulic control device 98 depending upon the currently selected position of the shift lever 72. Described more specifically, when the shift lever 72 is operated to the reverse position R, a REVERSE DRIVE pressure $P_R$ is generated in the hydraulic control device 98, to place the automatic transmission 16 in the reverse-drive position Rev. When the shift lever 72 is operated to the neutral position N, the hydraulic control device 98 is brought into a neutral position in which all of the clutches C1–C4 and brakes B1–B4 are placed in their released states, to place the automatic transmission 16 in the neutral position N for cutting off the power transmitting path.

Figure 6:
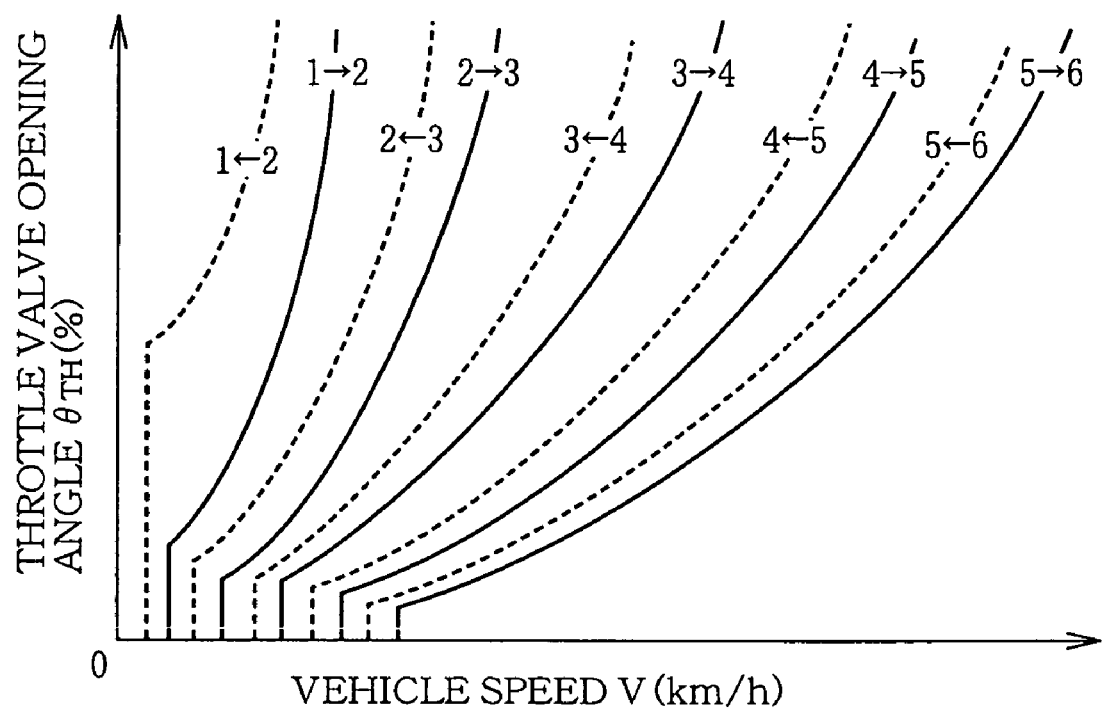
FIG. 6 is a view indicating an example of a shift control data map for automatically shifting the automatic transmission of the vehicle drive system of FIG. 1 depending upon a running condition of the vehicle.

When the shift lever 72 is operated to the drive position D or sequential position S, a FORWARD DRIVE PRESSURE $P_D$ is generated in the hydraulic control device 98, to place the automatic transmission 16 in the shift range D, or one of the six shift ranges D, 5, 4, 3, 2, L, for forward driving of the vehicle in an automatically selected one of the six forward drive positions $1^{st}$ through $6^{th}$. Described in greater detail, when the shift lever 72 is operated to the drive position D, this operation to the drive position D is detected by the lever-position sensor 74, and the electronic control unit 90 commands the hydraulic control device 98 to establish the automatic shifting mode in which the automatic transmission 16 is automatically shifted to one of the six drive positions $1^{st}$ through $6^{th}$, by energizing and de-energizing the solenoid-operated valves Sol–Sol5 and linear solenoid valves SL1 and SL2, to establish an appropriate one of the combinations of the operating states of the clutches C1–C4 and brakes B1–B4. The automatic shifting actions of the transmission 16 are effected on the basis of the detected vehicle running speed V and the detected opening angle $\theta_{TH}$ of the electronic throttle valve 56, and according to a shift control data map illustrated in FIG. 6, which is stored in the ROM of the electronic control unit 90. The shift control data map is formulated such that the automatic transmission 16 is shifted down to increase its speed ratio Nin/Nout, when the vehicle running speed V is lowered or when the throttle opening angle $\theta_{TH}$ is increased.

When the shift lever 72 is operated to the sequential position S, this operation to the sequential position S is detected by the lever-position sensor 74, and the electronic control unit 90 commands the hydraulic control device 98 to establish the manual shifting mode. As is apparent from FIG.

5, the sequential position S is located at the same position in the longitudinal or forward running direction of the vehicle, and are spaced apart from each other in the lateral direction of the vehicle, so that the hydraulic control device 98 is placed in the same position when the shift lever 72 is placed in the drive position D and the sequential position. In the sequential position S, however, the manual shifting mode is electrically established with the shift lever 72 placed in the sequential position S. In the manual shifting mode, one of the six shift ranges D, 5, 4, 3, 2, L can be established by sequentially operating the shift lever 72 in the shift-up or shift-down direction to a shift-up position (+) or a shift-down position (−). The operation of the shift lever 72 to the shift-up or shift-down position (+) or (−) is detected by the corresponding shift-up switch 80 or shift-down switch 82, and the corresponding shift-up command $R_{up}$ or shift-down command $R_{DW}$ is generated and applied to the electronic control unit 90, so that the currently selected shift mode is changed in the shift-up or shift-down direction. For example, when the shift lever 72 is shifted to the shift-down position (−) when the shift range 5 is currently selected, the shift position 5 is changed to the shift range 4. As indicated above, the six shift ranges D, 5, 4, 3, 2, L have the respective different numbers of the forward-drive positions $1^{st}$ through $6^{th}$ that are selectable. For instance, one of the five forward-drive positions $1^{st}$ through $5^{th}$ is selectable in the shift range 5, while one of the four forward-drive positions $1^{st}$ through $4^{th}$ is selectable in the shift range 4. In the selected shift range, the automatic transmission 16 is automatically shifted up or down on the basis of the detected vehicle speed V and throttle opening angle $\theta_{TH}$ and according to the stored shift control data map of FIG. 6, in the same manner as when the shift lever 72 is placed in the drive position D, except for the number of the forward-drive positions $1^{st}$ through $6^{th}$ in the shift ranges 5, 4, 3, 2 and L. In FIG. 7, "o" indicates the forward-drive positions in which the engine brake is applicable to the vehicle. If the shift lever 72 is repeatedly operated to the shift-down position (−) during running of the vehicle on a downhill roadway, for instance, from the shift range 4 to the shift range L through the shift ranges 3 and 2, the automatic transmission 16 is automatically shifted down sequentially from the fourth-speed position $4^{th}$ to the first-speed position $1^{st}$ through the third-speed and second-speed positions $3^{rd}$ and $2^{nd}$, and the amount of the engine brake applied to the vehicle is increased in steps as the automatic transmission 16 is shifted down from the fourth-speed position $4^{th}$ down to the first-speed position $1^{st}$.

The shift lever 72 cannot be held at the shift-up position (+) and shift-down position (−) by itself Namely, when the shift lever 72 operated to the shift-up or shift-down position (+) or (−) is released, the shift lever 72 is automatically returned to the original sequential position S under a biasing action of suitable biasing means. Thus, the shift lever 72 can be easily operated repeatedly to the shift-up or shift-down position (+) to select any one of the shift ranges D, 5, 4, 3, 2, L.

Figure 9:
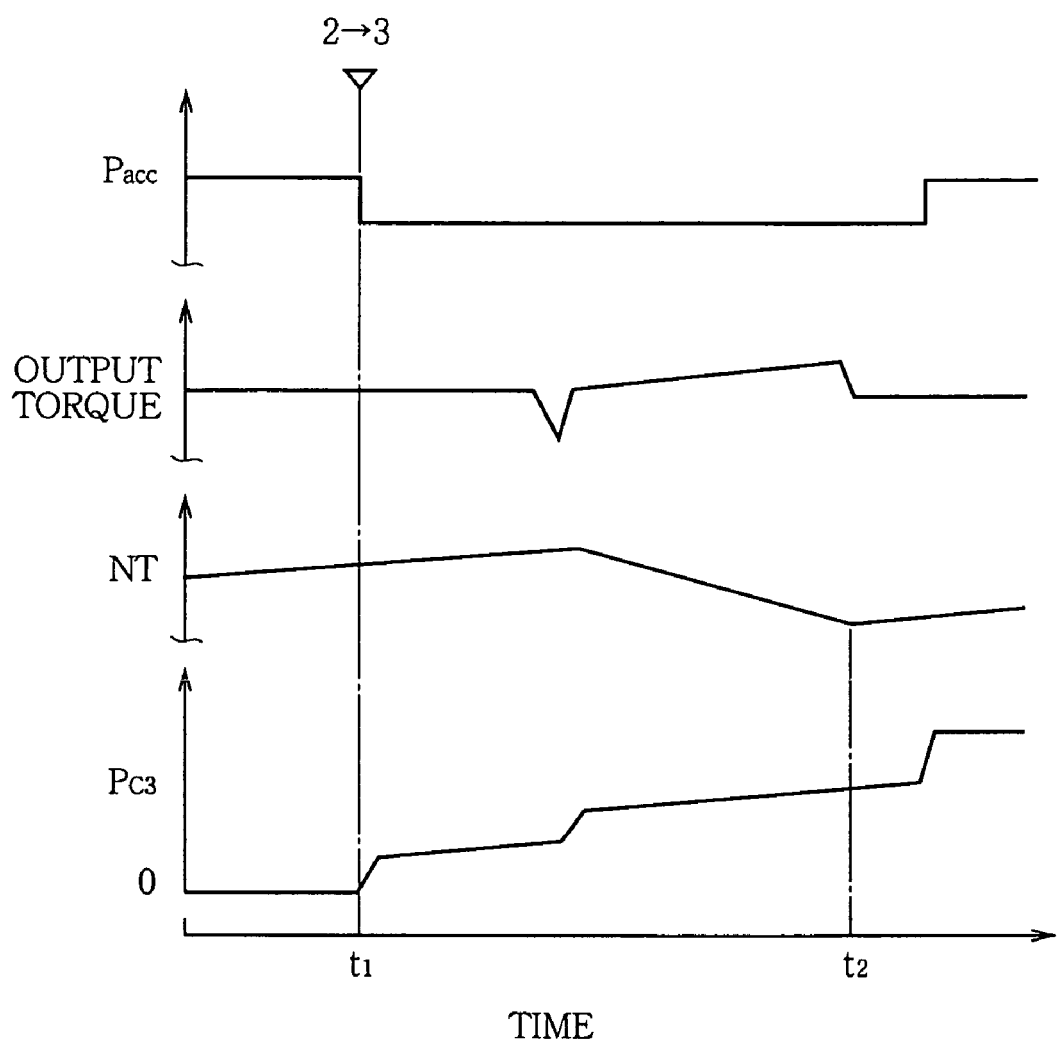
FIG. 9 is a time chart indicating an example of changes in some parameters of the vehicle drive system when the automatic transmission is shifted up from a second-speed position to a third-speed position by engaging the clutch C3.

Referring next to FIG. 8, there is shown a part of the hydraulic control device 98, which includes the third clutch C3 having a hydraulic cylinder 100 for frictional engagement thereof, and elements associated with this hydraulic cylinder 100, which elements include a 2–3, 5–6 shift valve 102 operable to shift up the automatic transmission 16 from the second-speed position $2^{nd}$ to the third-speed position $3^{rd}$, and from the fifth-speed position $5^{th}$ to the sixth-speed position $6^{th}$ Described more specifically, when the automatic transmission 16 is shifted up from the second-speed position $2^{nd}$ to the third-speed position $3^{rd}$, the spool of the 2–3, 5–6 shift valve 102 is brought to its position indicated in FIG. 8 on the left side of its centerline, in which the FORWARD DRIVE pressure $P_D$ (equal to a line pressure $P_I$) is supplied from the 2–3, 5–6 shift valve 102 to the hydraulic cylinder 100, so that a hydraulic pressure $P_{c3}$ in the hydraulic cylinder 100 is raised to place the clutch C3 in the engaged state. To the hydraulic cylinder 100 of the clutch C3, there is connected the above-indicated accumulator 104 which has an accumulator chamber 104a with a sufficiently large storage capacity and the above-indicated back-pressure chamber 10b the back pressure Pacc of which is controllable by an accumulator control valve 106 so that the hydraulic pressure $P_{c3}$ of the clutch C3 is smoothly or slowly raised while the back pressure Pacc is slowly reduced with a slow retracting movement of a piston 104p of the accumulator 104, whereby the clutch C3 is smoothly brought to its fully engaged state while maintaining a desired inertial-phase characteristic of the clutch C3 in the process of the engaging action, so as to reduce a shifting shock of the automatic transmission 16 during the shift-up action from the second-speed position $2^{nd}$ to the third-speed position $3^{rd}$. The accumulator control valve 106 is arranged to control the back pressure Pacc in the back-pressure chamber 104c of the accumulator 104 on the basis of a pilot pressure $P_{SLT}$ generated by the linear solenoid valve SLT described above. The pilot pressure $P_{SLT}$ is regulated under the control of the electronic control unit 90 by controlling the duty ratio or cycle of the electric current to be applied to the linear solenoid valve SLT. FIG. 9 is a time chart indicating an example of changes of some parameters of the vehicle drive system when the automatic transmission 16 is shifted up from the second-speed position $2^{nd}$ to the third-speed position $3^{rd}$ by engaging the clutch C3. In this example, the clutch C3 is commanded to be engaged at a point of time t1 to shift up the automatic transmission 16 from the second-speed position to the third-speed position, and the engaging action of the clutch C2 is completed at a point of time t2. To this end, the back pressure Pacc, that is, the pilot pressure $P_{SLT}$ is controlled to a predetermined value, for example. However, the pilot pressure $P_{SLT}$ may be controlled in a feedback fashion such that the turbine speed NT changes in a predetermined pattern or at a predetermined rate. The above-indicated accumulator control valve 106 and the linear solenoid valve SLT cooperate to constitute a back-pressure control device 108, as indicated in FIG. 8.

When the automatic transmission 16 is shifted up from the fifth-speed position $5^{th}$ to the sixth-speed position $6^{th}$, the spool of the 2–3, 5–6 shift valve 102 is brought to its position indicated in FIG. 8 on the right side of its centerline, in which the working fluid is discharged or drained from the hydraulic cylinder 100 and the accumulator chamber 104a of the accumulator 100 through the 2–3, 5–6 shift valve 102, a 3–4 shift valve 110 and a clutch control valve 112, so that the hydraulic pressure $P_{c3}$ is lowered to release the clutch C3, while the brake B2 (not shown I FIG. 8) is engaged, whereby the automatic transmission 16 is shifted up to the sixth-speed position $6^{th}$. The clutch control valve 112 is arranged to control an amount of the working fluid to be discharged from the hydraulic cylinder 100, according to a pilot pressure $P_{SL1}$ generated by the linear solenoid valve SL1, for thereby controlling the transient value of the hydraulic pressure $P^{c3}$ in the process of the releasing action of the clutch C3. The pilot pressure $P_{SL1}$ is controlled by the electronic control unit 90 by controlling the duty ratio or cycle of the electric current to be applied to the linear solenoid valve SL1. The clutch control valve 112 and the linear solenoid valve SL1 cooperate to constitute a clutch-releasing transient-hydraulic-pressure control device 114, as also indicated in FIG. 8.

Referring next to the flow chart of FIG. 10, there will be described a shift control routine executed by the electronic control unit 90 when the automatic transmission 16 is shifted up from the fifth-speed position $5^{th}$ to the sixth-speed position $6^{th}$, by controlling the pilot pressures $P_{SL1}$, $P_{SLT}$ and $P_{SL2}$ of the linear solenoid valves SL1, SLT and SL2, as indicated in the time chart of FIG. 11. According to this shift control routine, the automatic transmission 16 can be shifted up from the fifth-speed position $5^{th}$ to the sixth-speed position $6^{th}$, with an improved degree of operating response, even where the accumulator has a relatively large capacity. The time chart of FIG. 11 indicates an example of changes of the parameters of the vehicle drive system when the automatic transmission 16 is shifted up from the fifth-speed position $5^{th}$ to the sixth-speed position $6^{th}$ by releasing the clutch C3. The parameters include a hydraulic pressure $P_{B2}$ in the brake B2, and the pilot pressure $P_{SL2}$ of the linear solenoid valve SL2 arranged to control the hydraulic pressure $P_{B2}$ in the process of the engaging action of the brake B2.

Figure 10:
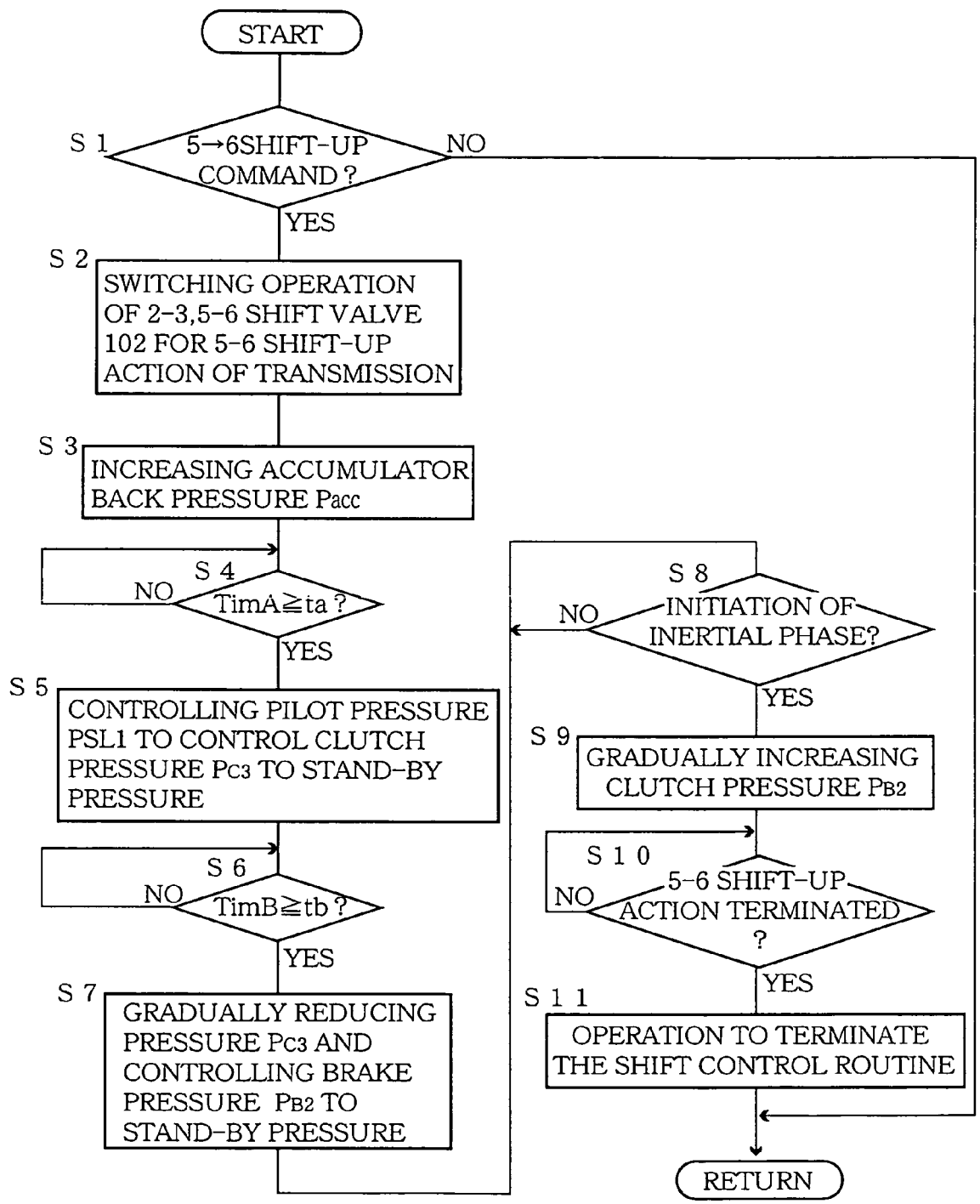
FIG. 10 is a flow chart illustrating a shift control routine executed by an electronic control unit of the control system of FIG. 3 when the automatic transmission is shifted up from a fifth-speed position to a sixth-speed position by releasing the clutch C3 and engaging a brake B2 of the automatic transmission.
Figure 11:
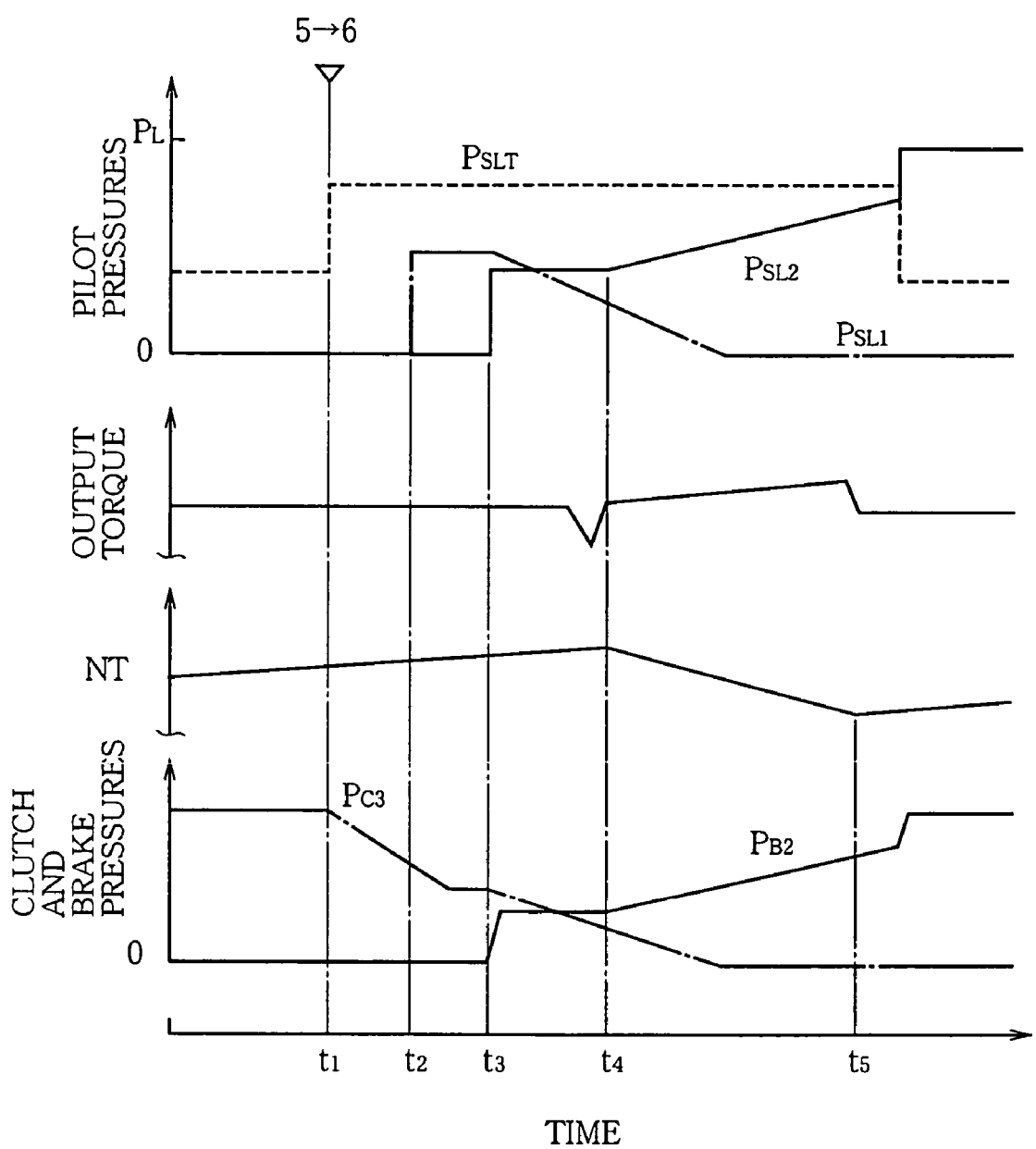
FIG. 11 is a time chart indicating changes in some parameters when the automatic transmission is shifted up according to the control routine of FIG. 10.

The shift control routine of FIG. 10 is initiated with step S1 to determine whether a 5–6 shift-up command to shift up the automatic transmission 16 from the fifth-speed position $5^{th}$ to the sixth-speed position $6^{th}$ has been generated. If an affirmative decision (YES) is obtained in step S1, the control flow goes to step S2 to energize the solenoid-operated valve Sol2 for placing the spool of the 2–3, 5–6 shift valve 102 to its position indicated in FIG. 8 on the right side of the centerline. Step S2 is followed by step S3, in which the pilot pressure $P_{SLT}$ of the linear solenoid valve SLT is increased to the maximum value, to maximize the back pressure Pacc of the accumulator 104. In the example of FIG. 11, the 5–6 shift-up command is generated at a point of time t1 at which the pilot pressure $P_{SL1}$ of the linear solenoid valve SL1 is equal to the atmospheric pressure, and the clutch control valve 112 is placed in the fully drained position. Since the back pressure Pacc in the back-pressure chamber 104b of the accumulator 104 is maximized in this condition, the working fluid is rapidly discharged or drained from the accumulator chamber 104a of the accumulator 104 through the 2–3, 5–6 shift valve 102, 3–4 shift valve 110 and clutch control valve 112. It will be understood that the back-pressure control device 108 and a portion of the electronic control unit 90 assigned to implement step S3 constitutes a back-pressure increasing portion operable to increase the back pressure Pacc in the back-pressure chamber 104b of the accumulator 104 for rapidly discharging the working fluid from the accumulator chamber 104a of the accumulator 104, when the hydraulically operated frictional coupling device in the form of the clutch C2 is released.

Step S3 is followed by step S4 to determine whether a predetermined time "ta" measured by a timer TimA has passed after the moment at which a discharge flow of the working fluid from the hydraulic cylinder 100 (from the accumulator chamber 104a) was initiated. If an affirmative decision (YES) is obtained in step S4, the control flow goes to step S5 in which the pilot pressure $P_{SL1}$ of the linear solenoid valve SL1 is controlled to be held at a predetermined value for controlling the hydraulic pressure PC3 of the clutch C3 to a predetermined stand-by value. In the example of FIG. 11, the affirmative decision (YES) is obtained in step S4 at a point of time t2, to initiate the control of the pilot pressure $P_{SL1}$. The pilot pressure $P_{SL1}$ (stand-by value of the hydraulic pressure $P_{C3}$) is controlled by learning compensation so that the releasing action of the clutch C3 and the engaging action of the brake B2 take place at desired timings.

Step S5 is followed by step S6 to determine whether a predetermined time "tb" measured by a timer TimB has passed after the control of the pilot pressure $P_{SL1}$ was initiated in step S5. When an affirmative decision (YES) is obtained in step S6, the control flow goes to step S7 in which the pilot pressure $P_{SL1}$ of the linear solenoid valve SL1 is gradually reduced to reduce the hydraulic pressure PC3 at a predetermined rate, while at the same time the pilot pressure $P_{SL2}$ of the linear solenoid valve SL2 is controlled to control the hydraulic pressure $P_{B2}$ of the brake B2 to a predetermined stand-by value. In the example of FIG. 11, the affirmative decision (YES) was obtained in step S6 at a point of time t3, to initiate the control of the pilot pressures $P_{SL1}$ and $P_{SL2}$ in step S7.

Step S7 is followed by step S8 to determine whether the automatic transmission 16 has initiated an inertial phase as a result of initiation of the releasing action of the clutch C3 and the engaging action of the brake B2. For example, this determination in step S7 is made by determining whether reduction of the turbine speed NT has been initiated. If an affirmative decision (YES) is obtained in step S8, the control flow goes to step S9 in which the pilot pressure $P_{SL2}$ of the liner solenoid valve SL2 is gradually increased to gradually increase the hydraulic pressure $P_{B2}$ at a predetermined rate, so that the brake B2 is smoothly brought to its fully engaged state, with a reduced shifting shock of the automatic transmission 16 upon the 5–6 shift-up action. In the example of FIG. 11, the affirmative decision (YES) is obtained in step S8 at a point of time t4, to initiate the gradual increase of the pilot pressure $P_{SL2}$ in step S9.

Step S9 is followed by step S10 to determine whether the 5–6 shift-up action of the automatic transmission 16 is terminated. For example, this determination in step S10 is made by determining whether the turbine speed NT has been lowered to a speed of synchronization which corresponds to the speed ratio of the automatic transmission 16 placed in the sixth-speed position $6_{th}$. When an affirmative decision (YES) is obtained in step S10, the control flow goes to step S11 to perform an operation to terminate the present shift control routine. In the example of FIG. 11, the affirmative decision (YES) is obtained in step S10, to initiate the operation to terminate the shift control routine, which includes an operation to increase the pilot pressure $P_{SL2}$ of the linear solenoid valve SL2 to its maximum value for increasing the hydraulic pressure $P_{B2}$ of the brake B2 to the line pressure level $P_L$, and an operation to lower the pilot pressure $P_{SLT}$ of the linear solenoid valve SLT for reducing the back pressure Pacc of the accumulator 104 to its nominal control level, as indicated in FIG. 11.

It will be understood from the foregoing description of the vehicle drive system and the control system according to the present embodiment of the invention, that a shift control apparatus operable to control shifting actions of the automatic transmission 16 including the frictional coupling devices in the form of the clutches C1–C4 and brakes C1–B4 is constituted by the accumulator 104, the back-pressure control device 108, the transient-hydraulic-pressure control device 114 (clutch control device 112 and linear solenoid valve SL1), and the control device 90 arranged to execute the shift control routine illustrated in the flow chart of FIG. 10. In the shift control apparatus according to the present embodiment, the hydraulic cylinder 100 for operating the clutch C3 is connected to the accumulator chamber 104a of the accumulator 104, which has the comparatively large capacity, and the back pressure Pacc in the back-pressure chamber 104b of the accumulator 104 is controllable. This arrangement permits intricate control of the transient hydraulic pressure $P_{C3}$ of the clutch C3 in the process of its engaging action for shifting the automatic transmission 16 from the second-speed position $2^{nd}$ to the third-speed position $3^{rd}$, so as to minimize the shifting shock of the automatic transmission 16 upon engagement of the clutch C3, owing to the provision of the accumulator 104 having the sufficiently large capacity.

Further, the shift control apparatus according to the present embodiment is arranged to increase the back pressure Pacc in the back-pressure chamber 104b of the accumulator 104 for rapidly discharging the working fluid from the accumulator chamber 104a, upon the releasing action of the clutch C3 for shifting up the automatic transmission 16 from the fifth-speed position $5^{th}$ to the sixth-speed position $6^{th}$, so that it is possible to shorten the time required before initiation of control of the transient hydraulic pressure $P_{C3}$ of the clutch C3 in the process of its releasing action and the transient hydraulic pressure $P_{B2}$ of the brake B2 in the process of its engaging action, whereby the shift-up action of the automatic transmission 16 can be achieved with an improved operating response, even if the accumulator 104 has the sufficiently large capacity. Thus, the present shift control apparatus is capable of solving the conventionally experienced problem that a relatively long time is required for complete discharging of the working fluid from the accumulator having a large capacity, leading to an accordingly long time required before initiation of control of the hydraulic pressure $P_{C3}$ since the control of the hydraulic pressure $P_{C3}$ is impossible until the accumulator 104 is fully drained, and an accordingly long time required before initiation of control of the hydraulic pressure $P_{B2}$.

Figure 12:
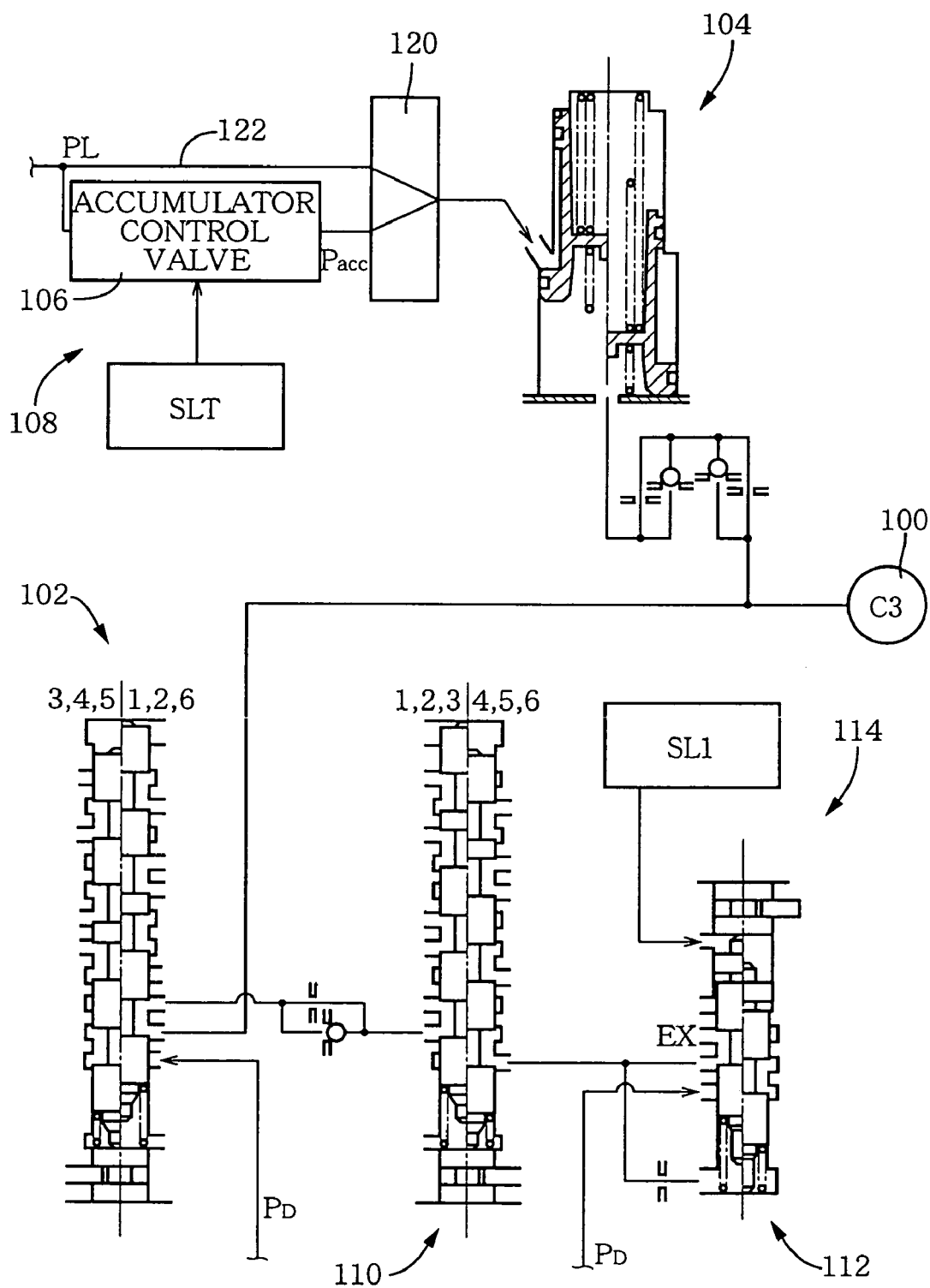
FIG. 12 is a view corresponding to that of FIG. 8, showing another embodiment of this invention.

In the illustrated embodiment, the back pressure Pacc of the accumulator 104 is increased by controlling the linear solenoid valve SLT, upon a releasing action of the clutch C3. However, the back pressure Pacc may be increased by applying the line pressure $P_L$ as the back pressure Pacc to the accumulator 104, through an electromagnetically operated switching valve 120 disposed between the accumulator control valve 106 and the accumulator 104, as shown in FIG. 12. In this second embodiment of the invention, the switching valve 120 has a line-pressure supply position in which the line pressure $P_L$ received through a supply passage 122 is applied to the back-pressure chamber 104b, and a controlled-pressure supply portion in which the pressure of the fluid controlled by the accumulator control valve 106 is applied to the back-pressure chamber 104b. Namely, the line pressure $P_L$ is applied to the back-pressure chamber 104b through the supply passage 122 and the switching valve 120 placed in the first position, so that the back pressure Pacc can be increased by application of the line pressure $P_{L2}$ to the back-pressure 104b of the accumulator 104. In the second embodiment, the releasing back-pressure increasing portion is constituted by the switching valve 120 and supply passage 122, and the portion of the electronic control unit 90 assigned to implement step S3 of the shift control routine of FIG. 10.

It is to be understood that the present invention may be embodied with various other changes, modifications and improvements, which may occur to those skilled in the art, without departing from the spirit and scope of the invention defined in the appended claims.

What is claimed is:

1. A shift control apparatus for controlling shifting actions of an automatic transmission including a hydraulically operated frictional coupling device having a hydraulic cylinder which is supplied with a working fluid when the frictional coupling device is engaged, said shift control apparatus comprising:
   a transient-hydraulic-pressure control device operable to control a transient value of a hydraulic pressure in the hydraulic cylinder of the frictional coupling device according to an electric signal, upon releasing of the frictional coupling device;
   an accumulator having a back-pressure chamber a back pressure of which is controllable, and an accumulator chamber connected to the hydraulic cylinder of the frictional coupling device and operable to control a transient value of the hydraulic pressure in the hydraulic cylinder, when the frictional coupling device is engaged with the working fluid being supplied to the hydraulic cylinder; and
   a back-pressure increasing portion operable to increase the back pressure in the back-pressure chamber of the accumulator for rapidly discharging the working fluid from the accumulator chamber, when the hydraulically operated frictional coupling device is released to effect one of said shifting actions of the automatic transmission.

2. The shift control apparatus according to claim 1, wherein said transient-hydraulic-pressure control device includes a linear solenoid valve, and a control valve controllable by said linear solenoid valve, said shift control apparatus further comprising a control device operable to control the linear solenoid valve for discharging the working fluid from the hydraulic cylinder of the frictional coupling device through said control valve such that the transient value of the hydraulic pressure in said hydraulic cylinder is continuously reduced after the back pressure is increased by said back-pressure increasing portion.

3. The shift control apparatus according to claim 1, further comprising a back-pressure control device operable to control the back pressure in the back-pressure chamber of the accumulator according to an electric signal during an engaging action of the frictional coupling device.

4. The shift control apparatus according to claim 3, wherein said back-pressure control device includes a linear solenoid valve, and an accumulator control valve which is controllable by the linear solenoid valve and which is connected to the back-pressure chamber of the accumulator, said back-pressure control device further comprising a control device operable to control the linear solenoid valve such that the back pressure of the accumulator during an engaging action of the frictional coupling device is slowly reduced.

5. The shift control apparatus according to claim 1, wherein said back-pressure increasing portion include a linear solenoid valve, an accumulator control valve which is controllable by the linear solenoid valve and which is connected to the back-pressure chamber of the accumulator, and a control device operable to control the linear solenoid valve of said back-pressure increasing portion such that a pressure of the working fluid supplied from the accumulator control valve to the back-pressure chamber is increased.

6. The shift control apparatus according to claim 1, wherein said back-pressure increasing portion includes: a supply passage; a switching valve which is connected to the back-pressure chamber of the accumulator and which has a line-pressure supply position in which a line pressure received through the supply passage is applied to the back-pressure chamber, and a controlled-pressure supply position in which a controlled pressure is applied to the back-pressure chamber; and a control device operable to place the switching valve in said line pressure supply position for applying the line pressure to the back-pressure chamber, to thereby increase said back pressure.

7. The shift control apparatus according to claim 6, further comprising a back-pressure control device including an accumulator control valve operable to control said controlled pressure to be applied to said back-pressure chamber through said switching valve placed in said controlled-pressure supply position during an engaging action of the frictional coupling device.

8. The shift control apparatus according to claim 1, wherein said back-pressure increasing portion is operable to increase the back pressure in the back-pressure chamber of the accumulator, when the hydraulically operated frictional coupling device is released to shift up the automatic transmission.

9. The shift control apparatus according to claim 8, wherein the automatic transmission further includes another hydraulically operated frictional coupling device which is engaged when the shift up action of the automatic transmission is effected with the release of said hydraulically operated frictional coupling device having the hydraulic cylinder connected to said accumulator chamber of the accumulator.

10. The shift control apparatus according to claim 9, wherein said transient-hydraulic-pressure control device is operated to reduce the hydraulic pressure in the hydraulic cylinder of said frictional coupling device connected to said accumulator chamber, to a predetermined stand-by pressure, when a predetermined time has passed after said back-pressure increasing portion is operated to increase said back pressure, said shift control apparatus further including a pressure control valve operable to increase a hydraulic pressure in a hydraulic cylinder of said another hydraulically operated frictional coupling device, to a predetermined stand-by pressure, when a predetermined time has passed after said transient-hydraulic-pressure control device is operated to reduce the hydraulic pressure in the hydraulic cylinder of the frictional coupling device connected to said accumulator.

* * * * *